United States Patent
Towner et al.

[19]

[11] Patent Number: 6,046,969
[45] Date of Patent: Apr. 4, 2000

[54] MULTIPLE CLOCK TRACKS FOR ERASABLE AND REWRITEABLE OPTICAL DISKS

[75] Inventors: David K. Towner, Boise, Id.; Josh N. Hogan, Los Altos, Calif.

[73] Assignee: Hewlett-Packard Company, Palo Alto, Calif.

[21] Appl. No.: 09/040,142

[22] Filed: Mar. 17, 1998

[51] Int. Cl.[7] .................................................... G11B 7/00
[52] U.S. Cl. ........................... 369/48; 369/275.3; 369/58
[58] Field of Search .................................. 369/48, 58, 54, 369/47, 32, 275.3, 53, 56; 360/77.03

[56] References Cited

U.S. PATENT DOCUMENTS

| | | | |
|---|---|---|---|
| 5,544,134 | 8/1996 | Yamamuro | 369/58 |
| 5,586,098 | 12/1996 | Nishida et al. | 369/13 |
| 5,636,075 | 6/1997 | Nishimura et al. | 360/48 |
| 5,680,267 | 10/1997 | Tanaka et al. | 360/51 |
| 5,689,479 | 11/1997 | Nomoto | 369/44.23 |

*Primary Examiner*—Nabil Hindi

[57] ABSTRACT

A system and method for generating a write clock for writing data along servo tracks of an erasable/rewriteable optical disk utilize clock patterns that correspond on a one-to-one basis to designated data zones on an optical disk. The clock patterns are located in one or more clock tracks and are dedicated to providing reference clock information. In one embodiment, an optical disk is divided radially into constant angular velocity (CAV) data zones and corresponding circular clock tracks are located near the outer edge of the disk. The circular clock tracks correspond on a one-to-one basis to the CAV data zones, and the unique clock patterns within the clock tracks are utilized to generate write clock signals. Clock information is read by a dedicated reference clock transducer and data is written to and read from a servo track of an optical disk by a read/write transducer. An optical disk drive equipped with the reference clock transducer and the read/write transducer also contains a clock circuit that receives reference clock signals and generates write clock signals. While generating write clock signals when data is written across CAV data zones, a first clock pattern is read to obtain a first write clock signal and a second clock pattern is read to obtain a second write clock signal. An optical disk and disk drive system in accordance with the invention are compatible with standard DVD-ROM formats.

24 Claims, 9 Drawing Sheets

MULTIPLE CLOCK TRACKS FOR ERASABLE AND REWRITEABLE OPTICAL DISKS

TECHNICAL FIELD

The invention relates generally to digital optical disks and more specifically to erasable and rewriteable digital optical disks.

BACKGROUND OF THE INVENTION

In an erasable and rewriteable Digital Video Disk (DVD), it is desirable to write a new block of data over existing data such that a data clock inherent in the new data block accurately conforms in both frequency and phase to the data clock inherent in the old data block. In the prior art, placement of data to be written on a recording layer of a rewriteable optical disk is typically determined by including synchronization information between fixed-length data sectors. Sectors are repeating units of pre-determined length. FIG. 1A shows a plan-view of a prior art optical disk 10 in which data stored along a servo track 12 is divided into sectors 14. FIG. 1B shows an expanded view of a sector 14 of the optical disk of FIG. 1A. The sector 14 includes a header 16, a data field 18 having a predetermined length, and an edit gap 20.

FIG. 1C shows an expanded view of the header 16 of FIG. 1B. The header 16 includes synchronization information 22 and track address information 24. The synchronization information 22 is also referred to as the sync field. The synchronization information 22 is permanently encoded on the recording layer of the optical disk 10 within the sectors 14. Data written onto the recording layer of the optical disk is synchronized to a write clock. The write clock is synchronized to a reference clock signal which is generated periodically as the synchronization information passes by an optical transducer while the optical disk is rotated. The reference clock signal provides information regarding the position of the optical transducer with respect to the synchronization information. However, while data within data field 18 is being written by the optical transducer, the reference clock signal may drift in frequency and phase. That is, when the optical transducer is between points at which synchronization information exists, the frequency and phase of the write clock can drift with respect to the synchronization information located within sectors. Drift of the write clock with respect to the synchronization information can be caused by disk rotation speed variations, servo track eccentricity and the cumulative effect of other variations in an optical disk recorder such as clock frequency drift. In general, the greater the distance between sync fields, the greater the drift of the write clock.

The edit gap 20 shown in FIG. 1B is included within the sector 14. A data field 18, which includes a fixed number of data bits, is typically written to the sector 14 of the recording layer of the optical disk 10. The edit gap 20 accommodates variations in the placement of the last data bit of the data field which is written to the sector. That is, although all data fields normally contain the same number of data bits, the edit gap allows the placement of the last data bit of a data field to be different each time the data field is rewritten. Therefore, placement of data bits written to the recording layer is not required to be as precise as the placement would be required to be if the edit gap did not exist. Edit gaps are needed to accommodate for drift of the write clock in prior art rewriteable optical disks.

Presently existing DVD-ROM formats do not include physical sectoring of data stored on the recording layer of an optical disk. Therefore, synchronization fields and edit gaps are not provided. When reading a ROM optical disk, a read clock is produced from the data stored on the optical disk, and therefore, no synchronization information is required.

The DVD-ROM format specification organizes data into fixed-length data fields for error correction code (ECC) purposes. Each data field has an associated header containing synchronization and address information to facilitate data readout. The synchronization and address information is stored on the disk in the form of data pits which are indistinguishable from the data pits used to encode user data. Although a DVD-ROM data field, together with its associated header information, makes up a "physical sector" for the purpose of a read-only memory, it does not satisfy the requirements of a physical sector for the purposes of a rewriteable optical disk memory. For this reason, all sectoring of the DVD-ROM format is treated as "logical sectoring." A logical sector is contained within the data, whereas a physical sector contains the data. Therefore, all synchronization information, addressing and other DVD-ROM formatting are treated in the same manner as user data, and are written on the disk in the form of data marks at the same time user data is written.

As a result, writing data to the recording layer of a rewriteable optical disk which is compatible with DVD-ROM formats requires data to be written to a disk having no physical sectors on the unwritten disk, and consequently, no address or synchronization information in dedicated areas within such physical sectors. Furthermore, edit gaps cannot be included. Without edit gaps, the data marks must be written with sub-bit accuracy during overwriting of pre-existing data.

The DVD-ROM format specification also describes a constant linear velocity (CLV) disk format which maximizes storage capacity but requires a continuously varying spindle speed. In developing an erasable DVD, performance can be significantly improved by radially dividing the disk into constant angular velocity (CAV) zones. Short length seek operations on a zoned CAV disk can be completed very quickly, because there is no need to change spindle speed as long as the seek does not cross a zone boundary. Since most seeks in a disk drive are short in length, zoned CAV provides much shorter average seek times than CLV, with essentially no loss of capacity. In addition, standard DVD-ROM drives can read zoned CAV disks because the fractional change in clock frequency across a zone boundary is only about 1%. In a DVD-ROM drive, the clock frequency change is within the acquisition range of the spindle speed servo loop and the data readout clock's phase-locked loop.

As a result, it is desirable to have a rewriteable optical disk, and optical disk recorder capable of recording data on the optical disk, wherein the recorded disk is compatible with DVD-ROM standard formats, and is readable by a standard DVD reader, and wherein pre-existing data on the optical disk can be rewritten (sometimes called over-written) with new data with sub-bit accuracy. The optical disk and optical disk recorder must be capable of generating a write clock which is synchronized with sub-bit accuracy to absolute positions along the servo tracks of the optical disk. Further, it is desirable to be able to write using standard DVD data formats.

SUMMARY OF THE INVENTION

The invention is a system and method for generating a write clock for writing data onto servo tracks of an erasable/rewriteable optical disk which utilizes clock patterns that have a one-to-one correspondence with designated data zones on an optical disk. The clock patterns are located in one or more clock tracks and are dedicated to providing reference clock information. In a preferred embodiment of the invention, an optical disk is divided radially into constant angular velocity (CAV) data zones and corresponding circular clock tracks are located near the outer edge of the disk. The circular clock tracks have a one-to-one correspondence to the CAV data zones, and the unique clock patterns within the clock tracks are utilized to generate write clock signals. Data is written in CAV data zones based upon write clock signals that correspond to the particular CAV data zones. In the preferred embodiment, the servo tracks and clock tracks are located on the same side of a disk, but the servo tracks and clock tracks may be located on opposite sides of a disk.

In an alternative embodiment of the disk, redundant clock tracks are provided on a disk. In a first arrangement, three redundant clock tracks are embossed side-by-side for each CAV data zone. Redundant adjacent clock tracks provide greater reliability during seek operations, because there are three identical clock tracks that can be located instead of only one clock track. In another arrangement, the redundant clock tracks are arranged into complete sets of clock tracks. That is, each redundant set includes one clock track corresponding to each of the CAV data zones and the resulting redundant sets are located adjacent to each other in a clock zone. Redundant sets of clock tracks provide protection in the event that a particular set of clock tracks is damaged.

In another alternative embodiment of the disk, there is a single clock track formed into a continuous spiral clock track, instead of multiple circular clock tracks. In a preferred application of this embodiment, the spiral clock track has a unique clock pattern in each revolution of the spiral, with each revolution of the spiral corresponding to a particular CAV data zone on the disk.

In one embodiment of the system, an optical disk drive is equipped with a read/write transducer that reads data from and writes data to servo tracks on an optical disk that has been divided into CAV data zones. The read/write transducer has coarse and fine positioners similar to those customarily used in the art that allow the transducer to access the radial extent of the disk. The optical disk drive is also equipped with a reference clock transducer that reads data from clock tracks on an optical disk, where the clock tracks have clock patterns that correspond on a one-to-one basis to the CAV data zones. To generate a write clock signal for writing data along servo tracks of an erasable/rewriteable optical disk, a clock circuit is attached between the read/write transducer and the reference clock transducer. The clock circuit receives a reference clock signal from the reference clock transducer and generates a uniquely corresponding write clock signal that is used by the read/write transducer for writing data into a target CAV data zone.

The reference clock transducer may have an enlarged focused spot for simultaneously reading two adjacent clock tracks. In another alternative embodiment, the clock circuit may contain circuitry for simultaneously generating two write clock signals from a single clock track containing patterns that correspond to two CAV data zones.

A method in accordance with the invention involves generating write clock signals in the situation in which data is written across boundaries between CAV data zones of a rewriteable optical disk. The method includes identifying a first servo track in a first CAV data zone in which data is to be written, and then reading from a clock track that contains clock patterns uniquely corresponding to the first CAV data zone. Next, the method involves identifying a second servo track in a second CAV data zone in which data is to be written and reading from a clock track that contains clock patterns uniquely corresponding to the second CAV data zone. Unique write clock signals are generated for each of the write operations.

An advantage of the invention is that synchronization fields and edit blocks are not required to be located on the writeable portion of an erasable/rewriteable optical disk. As a result, an optical disk and disk drive system are compatible with standard DVD-ROM formats and an optical disk has similar storage capacity to a DVD-ROM disk.

Another advantage is that the reference clock transducer can read from all of the clock tracks using only a fine positioner, thereby lowering the overall cost and complexity of the disk drive system.

DETAILED DESCRIPTION

Figure 1A:
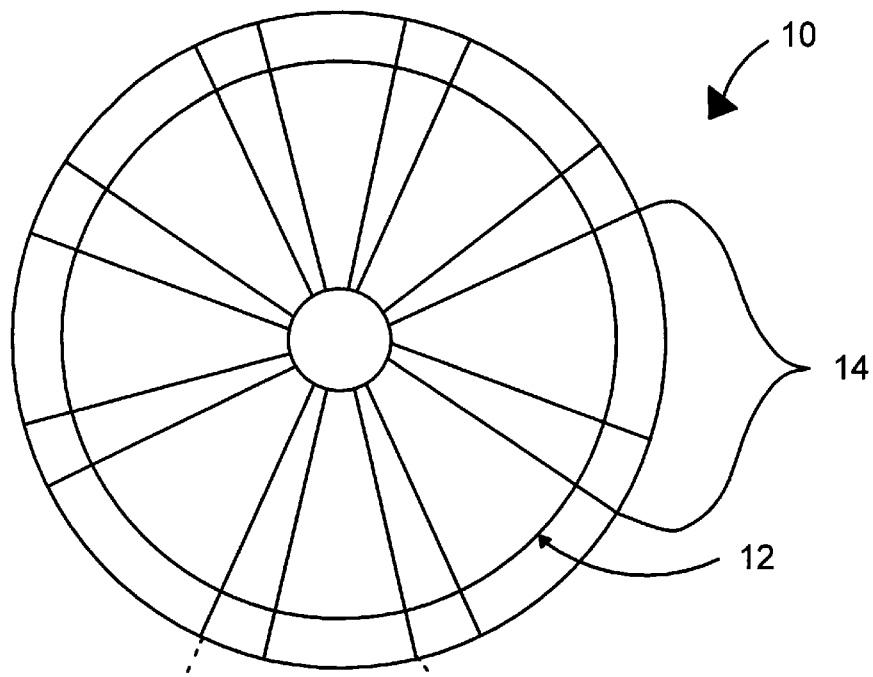
FIG. 1A is a plan view of a prior art optical disk with data sectors.
Figure 1B:
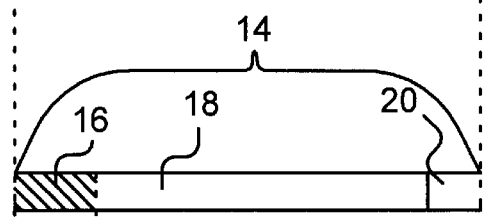
FIG. 1B is an expanded view of the sectors of FIG. 1A.
Figure 1C:
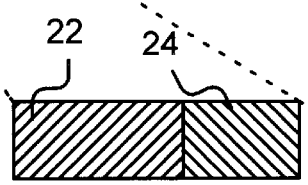
FIG. 1C is an expanded view of the header of FIG. 1B.
Figure 2:
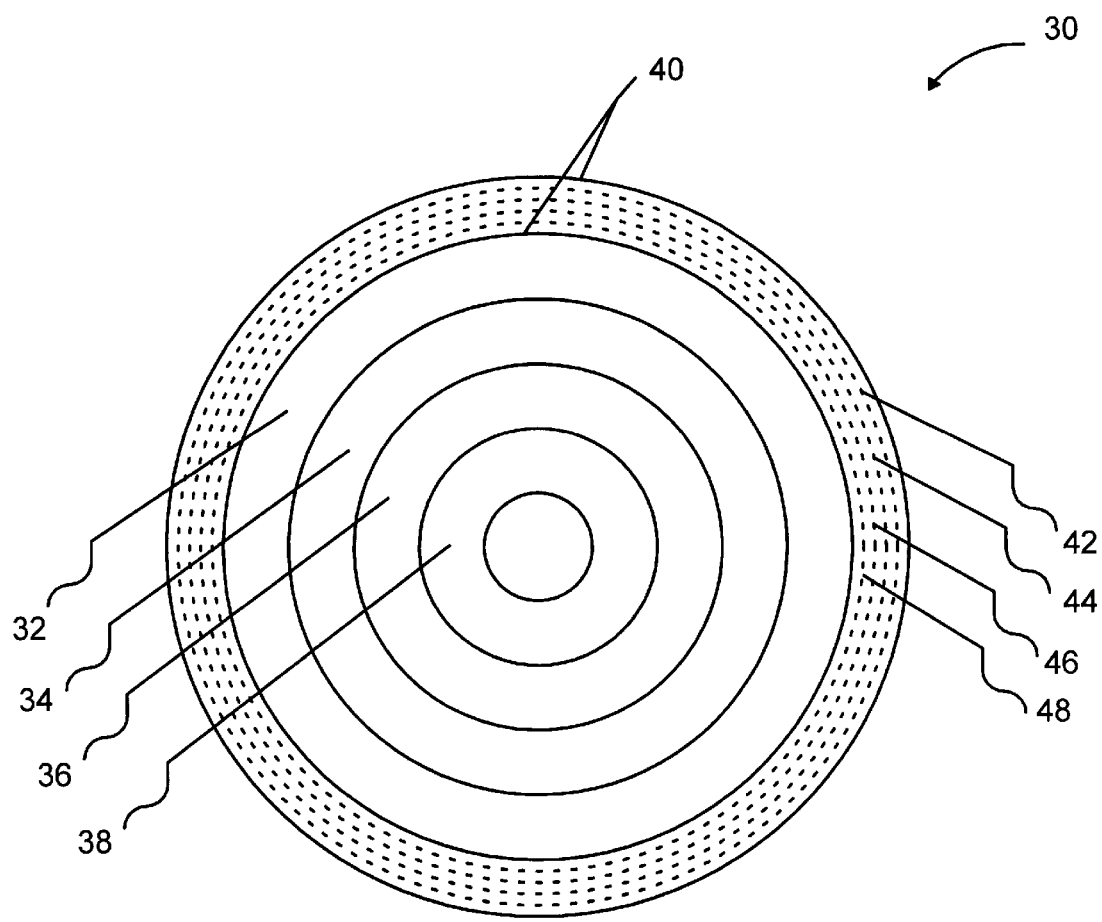
FIG. 2 is a plan view of an optical disk with CAV data zones and a clock track corresponding to each data zone in accordance with the invention.

FIG. 2 is a plan view of an optical disk 30 that has been divided into concentric data zones 32, 34, 36 and 38, with each data zone containing multiple servo tracks (not depicted). The data zones are arranged such that when the disk is rotated at a constant angular velocity (CAV), the servo tracks within a particular CAV data zone travel at linear velocities which differ by only a small amount between the inside and outside boundaries of the data zone. The servo tracks are permanent physical features on the surface of a disk to provide a track-following reference and to define a path along which data is read or written. A groove is an example of a servo track. In some types of pre-recorded optical disks, such as read only memory (ROM) disks, data structures formed on the recording layer also function as a servo track. Servo tracks may be arranged concentrically or as a continuous spiral, and for description purposes, reference to a servo track includes a single circular servo track or a single revolution of a spiral servo track, unless specifically designated otherwise.

A clock pattern is associated with each CAV data zone. The clock patterns are contained in a clock zone 40 and consist of permanently embossed marks, pits, width-modulated pre-grooves, and/or wobble grooves that generate reference clock signals specific to the corresponding CAV data zone. The clock patterns are contained in one or more clock tracks, typically either a spiral clock track or a series of circular clock tracks. Referring to FIG. 2, in a preferred embodiment the clock tracks represented by the dashed lines 42, 44, 46 and 48 are circular and are located near the outer edge of the CAV data zones.

Although the optical disk of FIG. 2 depicts only four CAV data zones 32–38 and four clock tracks 42–48, an actual disk may contain, for example, 100 CAV data zones with each zone containing 500 individual servo tracks. In accordance with a preferred embodiment of the invention, each one of the 100 CAV data zones has a corresponding clock track and, therefore, a 100 zone disk has 100 embossed clock tracks. At the standard DVD track spacing of 0.74 μm, the 100 clock tracks occupy a radial distance on the disk of 0.074 mm. All of the clock tracks are accessible by a reference clock transducer using only a fine positioner without the need to use a coarse positioner. For description purposes, reference to a clock track includes a single circular clock track or a single revolution of a spiral clock track, unless specifically designated otherwise.

In an alternative embodiment, one or more redundant clock tracks may be provided for each CAV data zone. Preferably, the redundant clock tracks are adjacent to the initial clock track. For example, instead of one clock track per data zone, there may be three identical clock tracks per data zone. Providing redundant clock tracks can improve disk yield during manufacture and disk reliability during operation. Disk reliability is improved because the reference clock transducer has a greater chance of finding a clock track in one seek operation if more than one clock track are present. If two redundant clock tracks are provided for each data zone, in the case of a 100 zone disk, 200 additional clock tracks would be present and the radial extent of the 300 clock tracks would increase to 0.222 mm. The fine positioner of a reference clock transducer is able to span 0.222 mm without requiring a coarse positioner.

For circular clock tracks, redundant tracks can be located next to each other in groups of two or more tracks, or redundant circular tracks may be grouped into complete redundant sets of clock tracks. For a spiral clock track, two spiral tracks can spiral together side-by-side or one complete spiral can be placed before or after a first spiral. Multiple complete sets of clock tracks may provide more effective redundancy than multiple adjacent redundant clock tracks, because the multiple complete sets of clock tracks are farther apart and therefore less vulnerable to corruption by the same defect.

Figure 3:
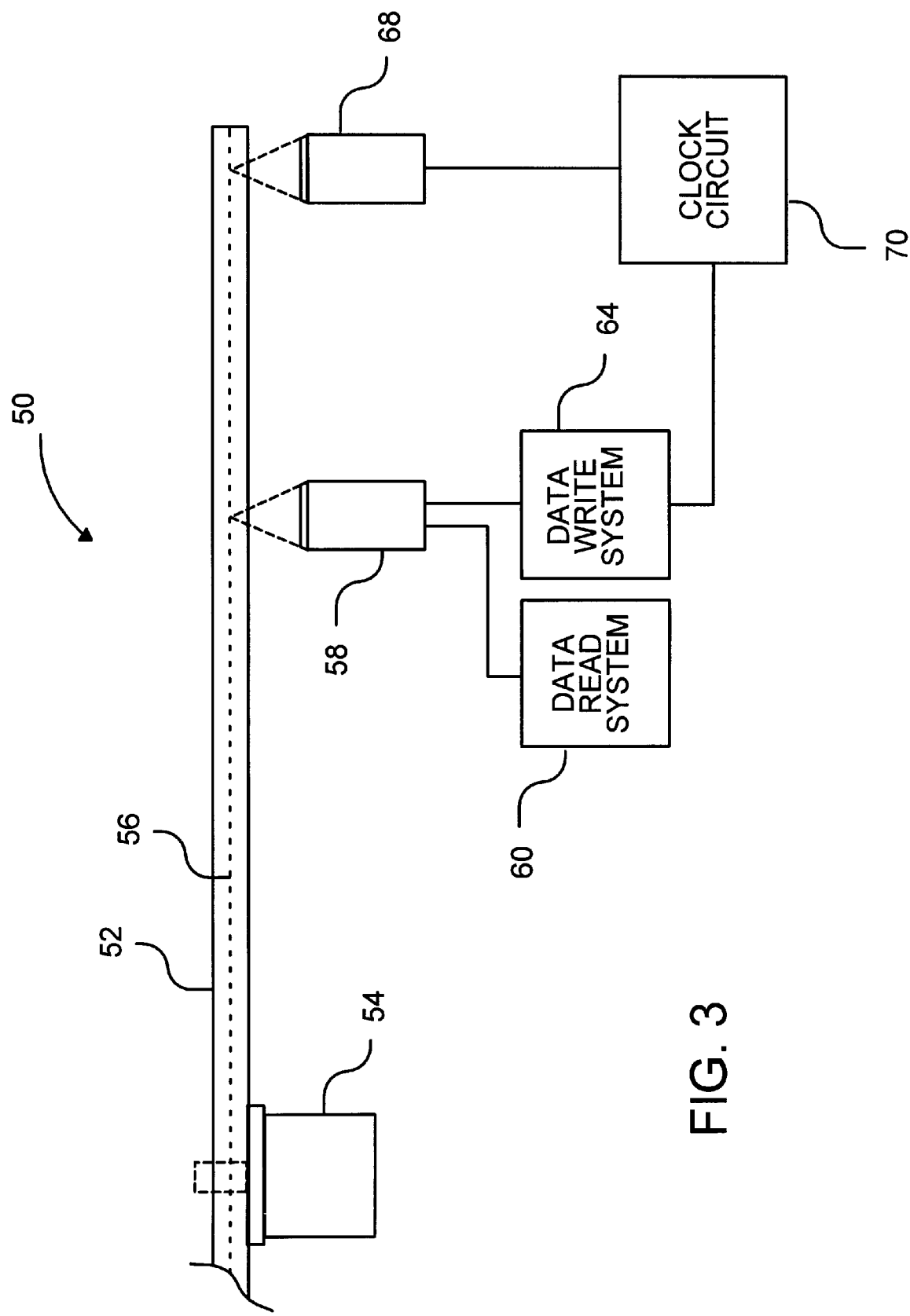
FIG. 3 is a depiction of an optical disk drive system with a reference clock transducer and a read/write transducer in accordance with the invention.

FIG. 3 is a diagram of an optical disk drive system 50 and a partially depicted optical disk 52 with recording layer 56. The partially depicted optical disk is connected to a conventional spindle motor 54 at the center of the disk. The preferred disk drive system has the ability to read and/or write data on only one side of a disk at a time, although alternative embodiments of the system include the ability to read and/or write data on both sides of a disk without flipping the disk. A read/write transducer 58 is provided to read data from and write to the servo tracks of the disk. The read/write transducer is a conventional system that typically utilizes laser light to read and write data on a disk. The read/write transducer is electrically connected to a data read system 60 and a data write system 64 which are both conventional systems. A reference clock transducer 68 is provided to read clock patterns from clock tracks on the disk. The reference clock transducer is electrically connected to a clock circuit 70 and the clock circuit is electrically connected to the data write system. The clock circuit receives the reference clock signals that are read from the clock tracks and generates write clock signals that are used by the write system to write data along servo tracks of the optical disk at the proper frequency and phase.

Although not shown, the disk drive system 50 includes other conventional electrical and mechanical components that control the rotation of the optical disk and the radial translation of the two transducer systems across the disk. For example, an additional circuit can control the radial positioning of the reference clock transducer in order to locate the transducer over the clock track corresponding to the CAV data zone that is targeted for writing. In an alternative embodiment of the disk drive system, the two laser systems may be integrated into a single laser system that generates two distinct laser beams.

Figure 4:
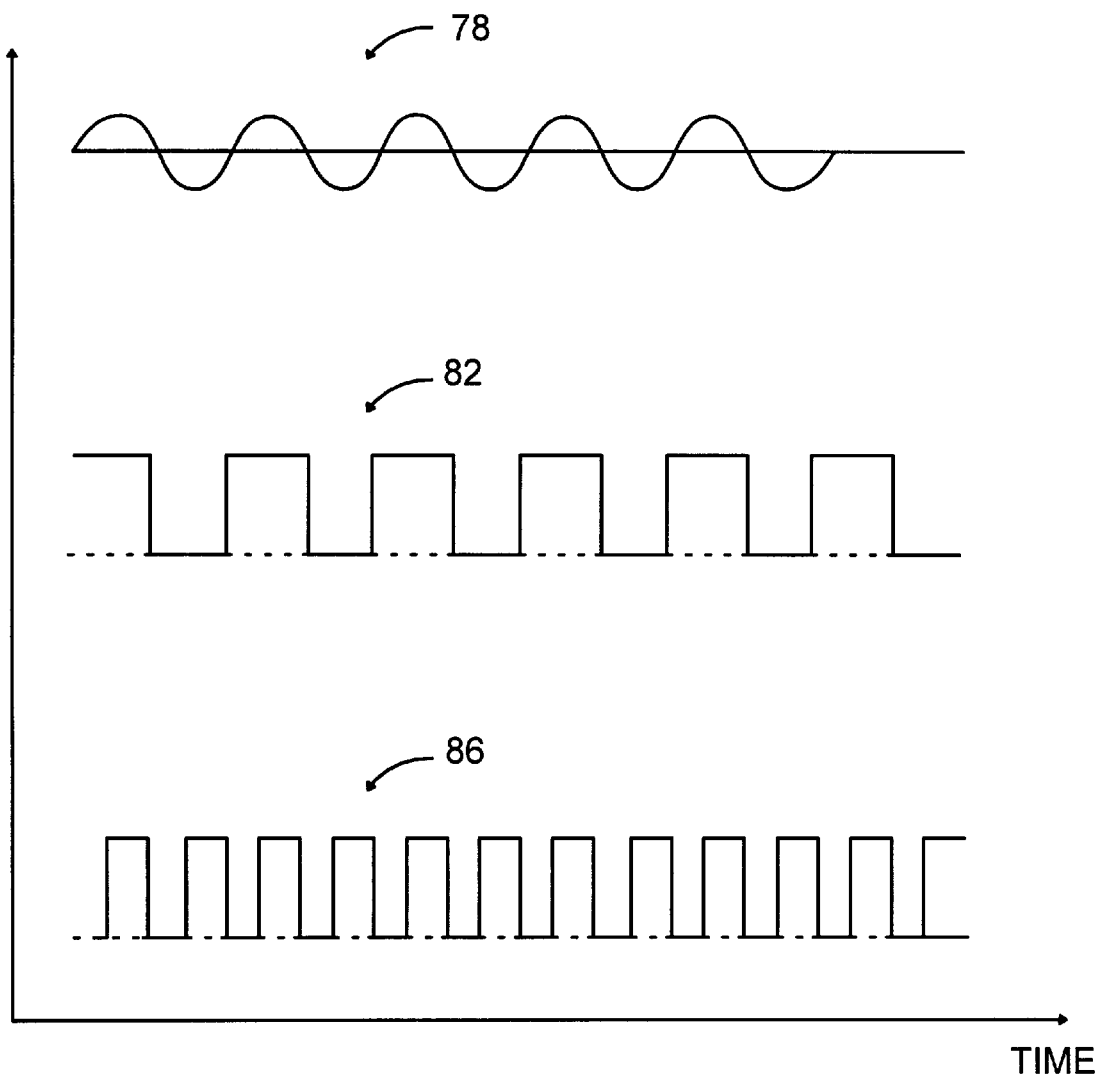
FIG. 4 is a depiction of related reference clock signals, square wave reference clock signals, and write clock signals.

In operation, when data is to be written along a servo track within a particular CAV data zone, the reference clock transducer 68 reads clock patterns from a clock track that corresponds to the particular CAV data zone in which data is to be written. As the optical disk rotates, the clock patterns pass by the reference clock transducer and the transducer generates a reference clock signal 78 as shown in FIG. 4. The reference clock signal is then processed by the clock circuit 70 into a square wave reference clock signal 82. The square wave reference clock signal is further processed by the clock circuit to produce a write clock signal 86 that is a function of the reference clock signal. The frequency of the write clock signal is typically an integer multiple of the frequency of the reference clock signal and the write clock signal is phase locked to the reference clock signal. The write clock signal remains phase synchronized with the reference clock signal regardless of the rotational speed of the disk, and the write clock signal is continuously utilized by the data write system throughout all write operations.

Although generating reference clock signals has been described above for writing data in a single CAV data zone, the process is slightly different when data is to be written along servo tracks that cross CAV data zone boundary.

Figure 5:
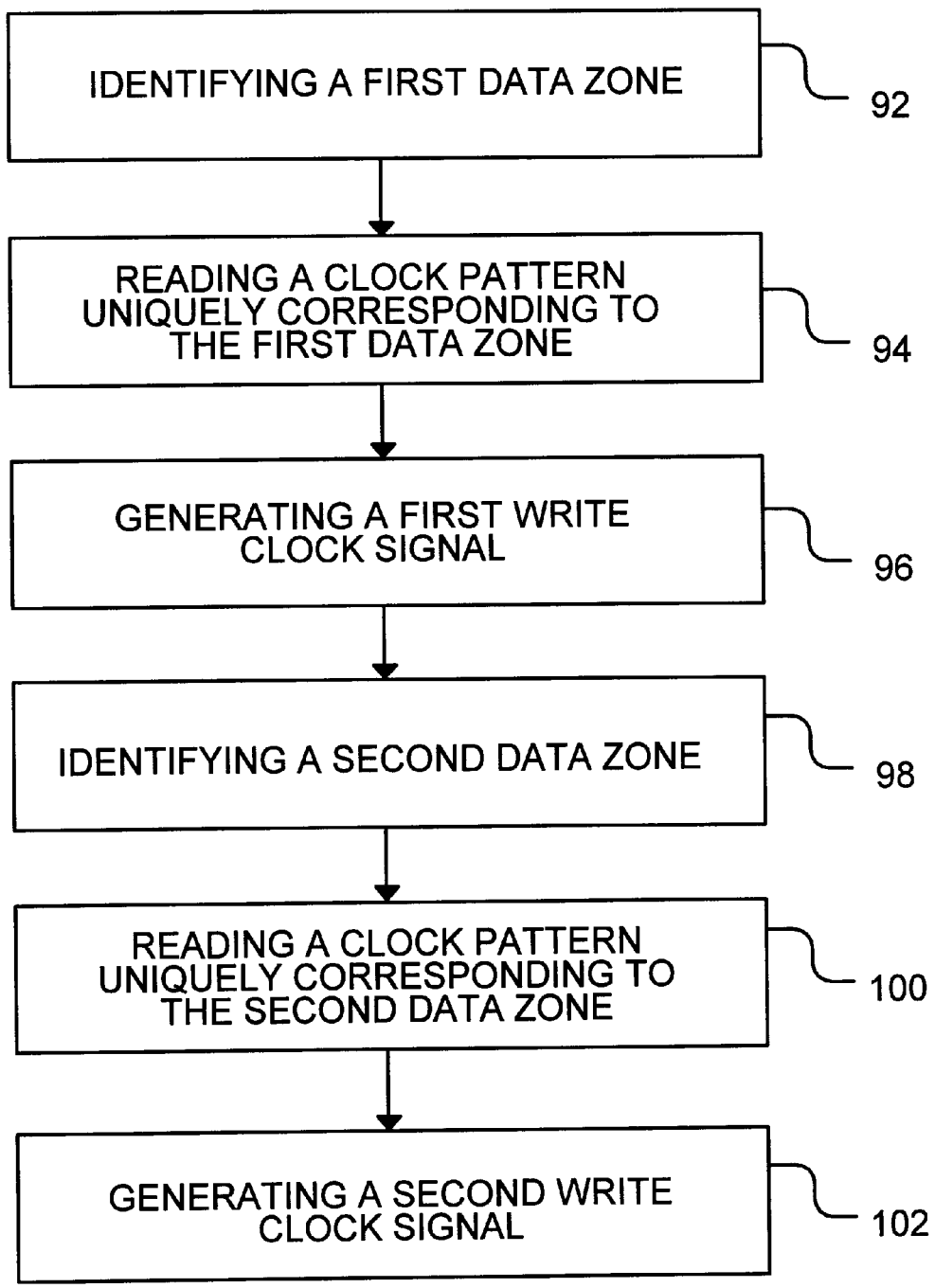
FIG. 5 is a process flow for generating reference clock signals for writing data across CAV data zone boundaries.

A general approach for generating reference clock signals for writing data across CAV data zone boundaries on an optical disk is depicted in FIG. 5. The approach is independent of whether or not the read/write and clock transducers are separate systems or an integrated system that generates two distinct laser beams. The approach involves a first step 92 of identifying a first data zone on the optical disk in which data is to be written by a data writing laser beam. The next step 94 is reading, with a clock reading laser beam, a clock track containing clock patterns that uniquely correspond to the first data zone. Reading the clock track allows a first reference clock signal to be generated. The next step 96 is generating a first write clock signal from the first reference clock signal. In step 98, a second data zone on the optical disk is identified for the writing of data by the data writing laser beam. The next step 100 is to read, with the clock reading laser beam, a clock track containing clock patterns that uniquely correspond to the second data zone. Reading the clock track allows a second reference clock signal to be generated. The last step 102 is generating a second write clock signal from the second reference clock signal. The first and second write clock signals correspond directly to the first and second data zones, and the signals are utilized by the data write system to set the frequency and the phase of data writing in the data zones.

The position on a disk at which a transition is made from one reference clock signal to a second reference clock signal during writing is referred to as a clock transition point. A clock transition point defines the boundary between adjacent CAV data zones. In general, clock transition points are determined when a disk is first recorded and do not change with subsequent rewriting of the disk. Most data formats, including the DVD data format, require data files to be partitioned into fixed-length data blocks for error correction and other purposes. In the DVD format, for example, these data blocks are 32 Kbytes in length. When writing new data on a previously recorded disk, in accordance with an embodiment of the invention the new data is written in integral multiples of the data block length, with the beginning and ending of new data blocks coinciding with the beginning and ending of previously written data blocks. The points at which one data block ends and the next one begins are called edit points. These are the only points at which an edit or over-write is permitted to begin or end.

At an edit point, if the preexisting data is not accurately phase-registered to the reference clock signal, then a problematic phase discontinuity between new data and preexisting data can occur when new data is written which begins or ends at the edit point. At a clock transition point, the phase accuracy between the write clock signal and the reference clock signal may be more difficult to maintain than at other locations on the disk. Data write system 64 in FIG. 3 may be programmed to place clock transition points at particular locations with respect to edit point locations. It may be desirable, for example, to place each clock transition point within a data block and near the beginning the data block. By making the clock transition points distant from the next following edit points, a possible temporary drift in the phase relationship between recorded data and the reference clock signal at these points will not cause problems when the data is later edited. Sufficient time is thereby provided for the clock circuit to fully stabilize after passing a clock transition point, and to establish an accurate phase relationship between the write clock signal and the reference clock signal before reaching the next edit point. This approach helps ensure the phase accuracy of recorded data at edit points and may be used to increase the reliability of the recording process.

In a preferred embodiment, the disk drive system 50 utilizes an optical disk 30 as depicted in FIG. 2 that has CAV data zones 32–38, and corresponding circular clock tracks 42–48 located near the outer edge of the disk. Each CAV data zone has only one corresponding clock track, and each clock track contains a permanently embossed clock pattern that is unique to the corresponding data zone. In a preferred approach to generating appropriate write clock signals when data is written across a CAV data zone boundary, the reference clock transducer 68 is first positioned into optical contact with a first clock track 48 that corresponds to a first CAV data zone 38. A first reference clock signal is generated from reading the first clock track 48 and data is written in the first CAV data zone 38 using a write clock that is generated from the reference clock signal. Then, as the read/write transducer 58 nears the outer edge of the first CAV data zone 38, data writing is temporarily suspended while the reference clock transducer is positioned into optical contact with a second clock track 46 corresponding to a second CAV data zone 36 that is to receive data writing. A second reference clock signal is generated from reading the second clock track 46 and then data writing is resumed in the second CAV data zone 36 according to a write clock signal that is generated from the second reference clock signal. Since the clock tracks 42–48 are concentrically arranged within the clock zone of the disk, the reference clock transducer may be moved to an adjacent clock track by adjusting the position of the reference clock transducer over a relatively short distance along a radius of the disk.

While it may be necessary to multiply the frequency of the reference clock signal from each clock track by a fixed integer to produce each write clock signal, all such reference clock signal frequencies would be multiplied by the same fixed integer, thereby minimizing error.

Figure 6:
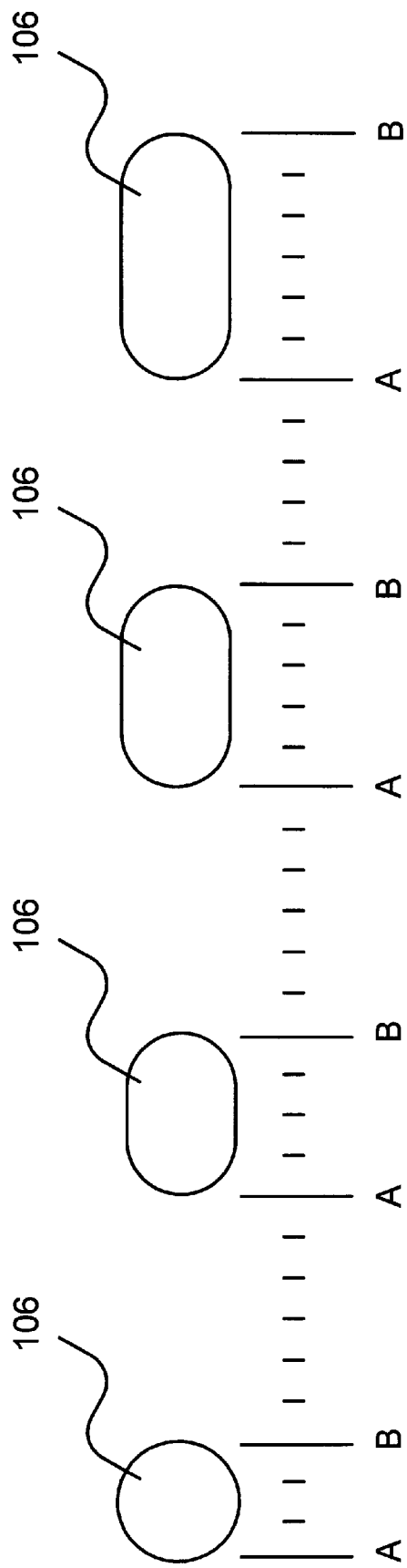
FIG. 6 is a depiction of a clock track with two clock patterns, one encoded at the leading edges and one encoded at the trailing edges of the clock pits.

In an alternative embodiment for making a write clock frequency change at the boundary between CAV data zones, two or more reference clock frequencies can be encoded into a single clock track. In one arrangement, a first clock pattern consists of the leading edge of each pit of the clock track and a second clock pattern consists of the trailing edge of each pit. FIG. 6 depicts a series of pits 106 along a clock track where each pit edge determines a zero crossing of the reference clock signal. For example, in FIG. 6, the leading edge of each pit, A, determines a first reference clock pattern and the trailing edge of each pit, B, determines a second reference clock pattern. A clock track encoded with two clock patterns provides a reference clock signal from which the clock circuit can generate two corresponding write clock signals.

Figure 7:
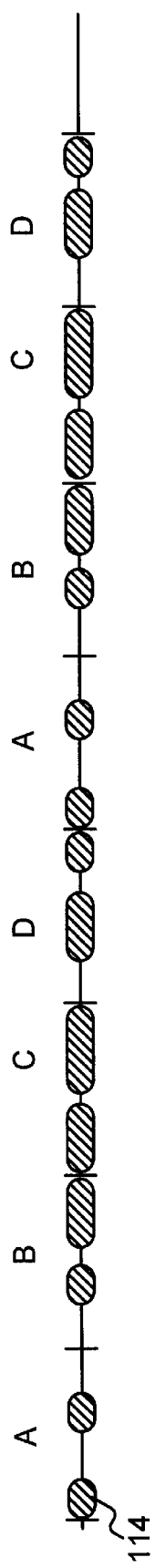
FIG. 7 is a depiction of a clock track with four repeating clock patterns encoded into a single clock track.

Other clock track arrangements can be used to encode two or more reference clock signals into one clock track. For example, FIG. 7 is a depiction of a clock track with pits 114 that are arranged to create a repeating sequence of clock patterns such as ABCD. Although only two pits are shown for each repeating pattern, typically many more pits would be utilized. As shown, clock pattern A encodes a first repeating clock signal, clock pattern B encodes a second repeating clock signal, and so forth. The clock patterns are continuously repeated at a high frequency to maintain accurate phase synchronization of each of the four write clock signals that are being continuously generated by the clock circuit at four different frequencies. The ability to generate two or more write clock signals from a single clock track makes it possible to write across one or more CAV data zone boundaries without interrupting the data writing process. Write clock frequency changes are accomplished by switching from one write clock signal to another between clock cycles at the location of the CAV data zone boundaries.

A position reference signal may also be encoded into a clock track. The additional position reference signal has various potential uses, such as verifying the accuracy of clock recovery in the event that a defect in a clock track makes it necessary for the write clock to operate in an open loop manner for multiple clock cycles.

Another alternative embodiment for making write clock frequency changes at the boundary between CAV data zones includes utilizing adjacent clock tracks without intervening redundant clock tracks. In applying the optical disk of FIG. 2 to the disk drive system of FIG. 3, the reference clock transducer 68 generates a laser beam with an enlarged or elliptical focused spot. The focused spot is large enough that two adjacent clock tracks can be read simultaneously with a single clock reading laser beam. During a write operation, as the read/write transducer 58 nears the boundary between CAV data zones, the clock reading transducer positions its laser beam midway between the clock track for the current CAV data zone and the clock track for the next CAV data zone thereby enabling the simultaneous reading of two clock tracks. Clock circuit 70 then separates two simultaneously generated reference clock signals generated from the two clock tracks and simultaneously generates two write clock signals, switching from the current write clock to the new write clock at the boundary between CAV data zones. Since the patterns used to encode the reference clock signals change at least once per revolution and are never the same on adjacent tracks, the clock circuit is able to separate the two clock signals even where the frequency difference between the signals is small.

In another alternative embodiment of the invention, an optical disk has CAV data zones on one side of the disk and corresponding clock tracks on the other side of the disk. A compatible disk drive has a read/write transducer on the CAV data zone side of the disk and a clock transducer on the clock track side of the disk. In order to generate a reliable write clock signal, a highly repeatable mapping between the phase of the reference clock signal and the position of the read/write laser spot along the data tracks is required. Repeatable mapping is achieved by providing a mechanical connection between the read/write transducer and the reference clock transducer that is rigid in the in-track direction. Providing the read/write and reference clock transducers on opposite sides of an optical disk greatly reduces mechanical interferences between the two optical systems.

Figure 8:
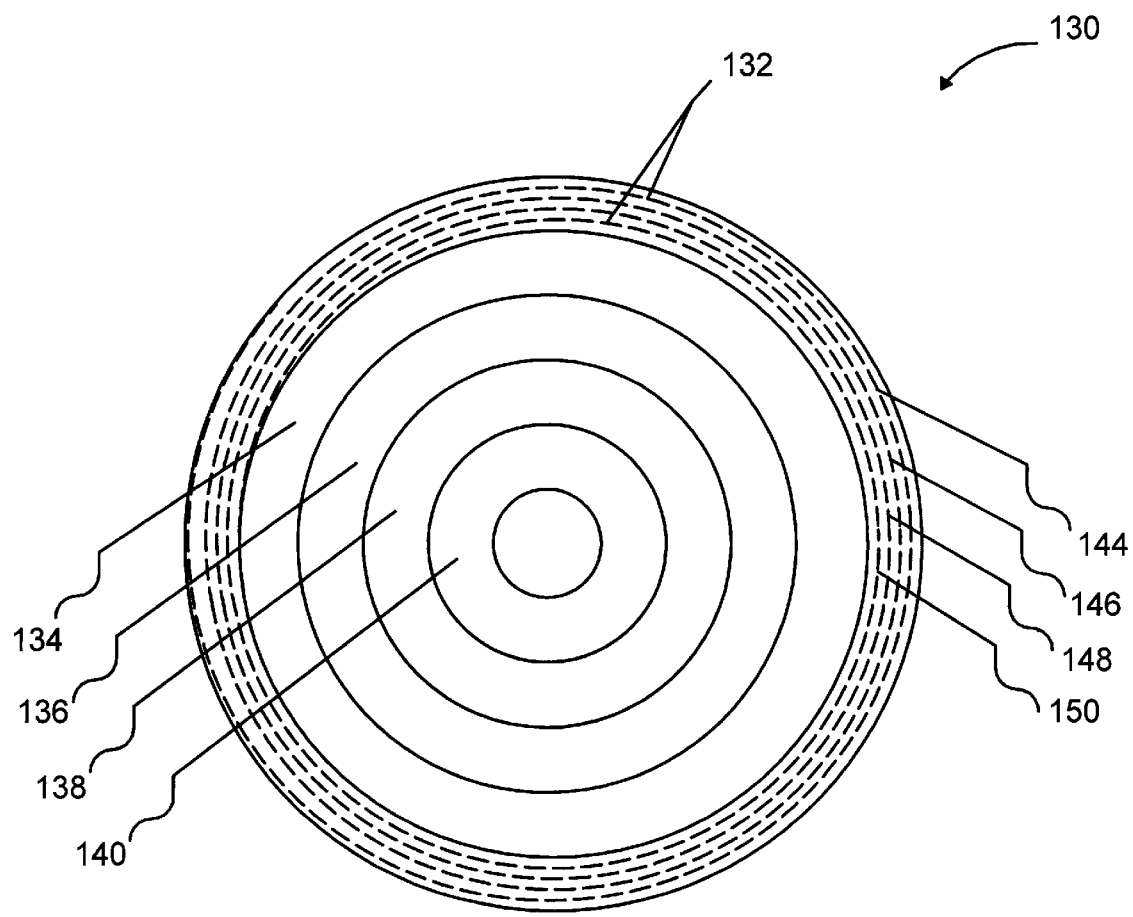
FIG. 8 is a plan view of an optical disk with CAV data zones and a corresponding spiral clock track near the outer edge of the CAV data zones in accordance with the invention.

In another alternative embodiment, an optical disk 130 has a spiral clock track 132, as depicted in FIG. 8. The spiral clock track 132 is encoded with one clock frequency in each revolution of the spiral, so that a disk with for example four CAV data zones 134, 136, 138 and 140 requires a clock track with four revolutions 144, 146, 148 and 150 in the spiral. While writing data within a given CAV data zone, the reference clock transducer 68 of FIG. 3 remains on the particular revolution of the spiral that is encoded with the appropriate clock frequency for that zone. Once per revolution of the disk, the reference clock transducer performs a one track seek to return to the beginning of the current revolution of the spiral. In order to maintain continuity of the write clock signal during the one track seek, the reference clock transducer simultaneously generates reference clock signals from two adjacent revolutions or "tracks" during the course of the seek. The clock pattern used to encode the clock information changes during each revolution of the disk and never repeats itself on adjacent tracks. Therefore, the clock circuit can distinguish signals from adjacent tracks to correctly decode two or more reference clock signals at once. The one track seek can then be performed without losing the signal from either track, and a repeatable electronic transfer from one reference clock signal to the other can be made.

When making a write clock frequency change at the boundary between CAV data zones, the reference clock transducer 68 continues to follow the spiral of the clock track 132 into the next revolution, thus making an uninterrupted and repeatable transition from one reference clock frequency to another. Protection against mastering defects in a spiral clock track can be obtained by providing two or more complete clock track spirals, each containing all of the clock patterns needed to record the entire disk.

Figure 9:
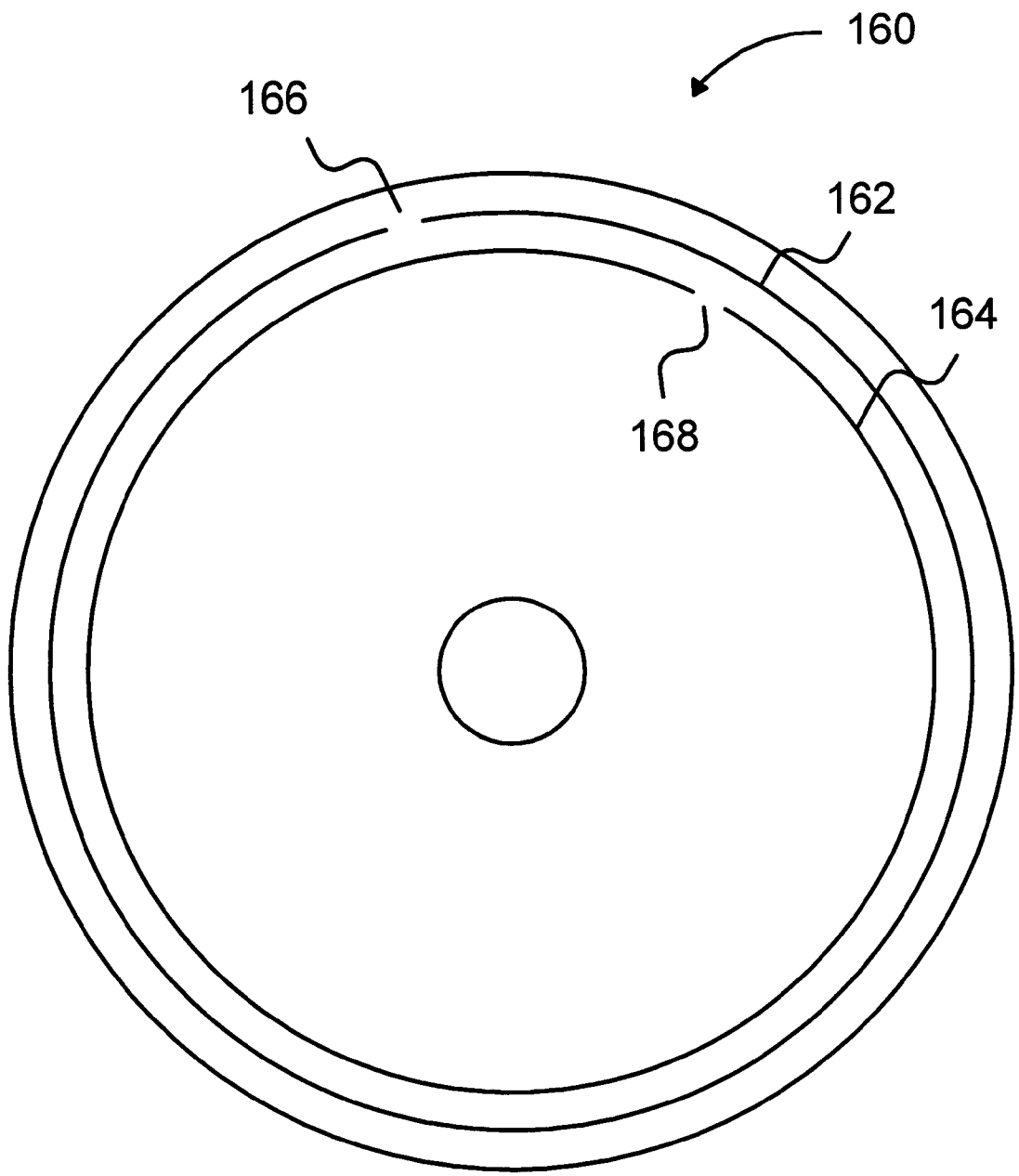
FIG. 9 is a plan view of an optical disk with two adjacent clock tracks that are offset from each other.

One concern that exists when circular clock tracks are utilized is that a phase discontinuity may occur between the beginning of a circular clock track and the end of the circular clock track. The phase discontinuity is created because the clock pattern cannot be spaced perfectly in phase at the transition from the end of the circular clock track to the beginning of the circular clock track. Possible approaches to correcting the phase discontinuity include an electronic approach and an optical approach. In the electronic approach, an algorithm is applied to the reference clock signal to correct the phase error. In the optical approach, as depicted in FIG. 9, adjacent redundant circular clock tracks 162 and 164 of an optical disk 160 are staggered, so that the end points 166 and 168 of the clock tracks are not radially aligned. An enlarged focused spot is then used to read both clock tracks simultaneously and a reference clock signal can be determined from the adjacent continuous clock track when a clock track end point on an adjacent clock track is encountered by the reference clock transducer.

Another problem that may exist involves correcting for phase errors that are caused by disk centering errors. Disk centering errors occur when a disk is written a first time while rotating about a first center point and then written a second time while rotating about a second center point. An approach to solving this problem can include adding clock tracks at the inner and outer edges of the disk with separate clock transducers reading the tracks. The two clock signals are then correlated to correct the phase of the write clock, thus correcting for any disk centering errors. Typically, there are stamped pits at the inner diameter of a rewriteable disk. This may be used to calibrate out disk centering errors. If necessary, additional clock reference information could be included in this stamped area.

What is claimed is:

1. An optical disk having first and second sides comprising:
    a recording layer having servo tracks arranged in a plurality of data zones; and
    a plurality of clock patterns that correspond on a one-to-one basis to said plurality of data zones, each clock pattern having a configuration for determining a write clock used for writing data into a data zone that corresponds to said each clock pattern, said clock patterns being grouped within a region of the disk and being formed within at least one clock track on at least one of said first and second sides.

2. The optical disk of claim 1 wherein said plurality of data zones are substantially constant angular velocity (CAV) data zones that are concentrically arranged on at least one of said first and second sides.

3. The optical disk of claim 1 wherein said plurality of clock patterns are formed within a plurality of circular clock tracks.

4. The optical disk of claim 3 wherein each circular clock track contains a clock pattern having clocking information that is unique to one of said data zones, said circular clock tracks thereby having a one-to-one correspondence with said plurality of data zones.

5. The optical disk of claim 4 wherein said plurality of circular clock tracks are located in a side-by-side relationship near an inside or an outside edge of said plurality of data zones.

6. The optical disk of claim 5 further comprising a redundant circular clock track for at least one of said data zones, said redundant circular clock track being a substantial duplication of a first circular clock track.

7. The optical disk of claim 6 wherein said redundant circular clock track is located adjacent to said first circular clock track.

8. The optical disk of claim 6 wherein a set of redundant circular clock tracks is located adjacent to a substantially identical set of first circular clock tracks.

9. The optical disk of claim 1 wherein a single circular clock track contains first and second clock patterns, said first clock pattern uniquely corresponding to a first data zone, and said second clock pattern uniquely corresponding to a second data zone.

10. The optical disk of claim 1 wherein said plurality of clock patterns are located on said second side of said optical disk and said data zones are on said first side.

11. The optical disk of claim 1 wherein said at least one clock track includes a spiral clock track having said clock patterns formed therein.

12. The optical disk of claim 11 wherein said optical disk contains at least one redundant spiral clock track that is substantially identical to a first spiral clock track.

13. The optical disk of claim 11 wherein said spiral clock track has a one-to-one correspondence between said plurality of data zones and revolutions of said spiral clock track, each revolution having a clock pattern that corresponds to a data zone.

14. The optical disk of claim 1 wherein said plurality of clock patterns are formed within a plurality of clock tracks and wherein said clock tracks are located sufficiently close together that all of said clock tracks can be read by a transducer using a fine positioner.

15. The optical disk of claim 1 wherein said plurality of clock patterns are located near an inner edge of said optical disk and wherein a second plurality of clock patterns that corresponds on a one-to-one basis to said plurality of data zones are located near an outer edge of said optical disk.

16. An optical disk drive comprising:
first transducer means for reading and writing data along a servo track located within any one of a plurality of data zones on an optical disk, wherein each one of said data zones has a uniquely corresponding clock pattern located within a clock track on said optical disk wherein said clock track is one of a plurality of clock tracks grouped within a region of said disk;
second transducer means for reading one of said clock patterns from said clock track that uniquely corresponds to a data zone that is targeted for writing by said first transducer means and for generating a reference clock signal from said clock pattern;
control means for positioning said second transducer means such that said second transducer means can read clock patterns from whichever one of said plurality of clock tracks that contains said clock pattern corresponding to said data zone that is targeted for writing by said first transducer means; and
clock circuit means for receiving said reference clock signal from said second transducer means and for generating a uniquely corresponding write clock signal to be used by said first transducer means for writing data onto said targeted data zone.

17. The optical disk drive of claim 16 wherein said second transducer means has an enlarged focused spot for simultaneously reading adjacent first and second reference clock tracks containing said uniquely corresponding clock patterns that correspond to first and second data zones.

18. The optical disk drive of claim 16 wherein said clock circuit means contains circuitry for simultaneously generating two write clock signals from a single clock track containing clock patterns that correspond to first and second data zones.

19. The optical disk drive of claim 16 wherein said first transducer means is positioned to be responsive to a first side of said optical disk and said second transducer means is positioned to be responsive to a second side of said optical disk.

20. The optical disk drive of claim 16 wherein said second transducer means is located to read near an inner edge of said optical disk and further including a third transducer means similar to said second transducer means except that said third transducer means is located to read near an outer edge of said optical disk.

21. The optical disk drive of claim 16 wherein said second transducer means has a maximum adjustable access range of a fine positioner.

22. A method for generating write clock signals when writing data across CAV zone boundaries of a rewritable optical disk comprising the steps of:
identifying a first data zone on an optical disk in which a first portion of said data is to be written by a data writing laser beam;
reading, with a clock reading laser beam, a clock pattern that uniquely corresponds to said first data zone and generating a first reference clock signal;
generating a first write clock signal from said first reference clock signal;
writing said first portion of said data in said first data zone in accordance with said first write clock signal;
identifying a second data zone on said optical disk in which a second portion of said data is to be written by said data writing laser beam;
reading, with said clock reading laser beam, a clock pattern that uniquely corresponds to said second data zone and generating a second reference clock signal;
generating a second write clock signal from said second reference clock signal; and
writing said second portion of said data in said second data zone in accordance with said second write clock signal,
wherein said first and second clock patterns are grouped within a region of the disk.

23. The method of claim 22 wherein said steps of:
reading a clock pattern that uniquely corresponds to said first data zone includes a step of positioning said clock reading laser beam into optical contact with a first clock track that corresponds to said first data zone using a fine positioner; and
reading a clock pattern that uniquely corresponds to said second data zone includes a step of positioning said clock reading laser beam into optical contact with a second clock track that corresponds to said second data zone using said fine positioner.

24. The method of claim 22 wherein said steps of reading a clock pattern that uniquely corresponds to said first data zone and reading a clock pattern that uniquely corresponds to said second data zone include a step of reading a clock track that contains both said clock pattern that uniquely corresponds to said first data zone and said clock pattern that uniquely corresponds to said second data zone, and further including a step of electronically separating said first and second reference clock signals.

* * * * *